United States Patent [19]

Jones

[11] 4,222,100
[45] Sep. 9, 1980

[54] POWER TRANSITION CIRCUIT

[75] Inventor: Billy E. Jones, Huntsville, Ala.

[73] Assignee: The United States of America as represented by the Secretary of the Army, Wasington, D.C.

[21] Appl. No.: 964,115

[22] Filed: Nov. 27, 1978

[51] Int. Cl.² ............................................. H02M 7/00
[52] U.S. Cl. .................................. 363/124; 307/240; 307/253; 363/131
[58] Field of Search .............. 307/240, 253, 254, 273; 363/20, 41, 124, 131

[56] References Cited

U.S. PATENT DOCUMENTS

| | | | |
|---|---|---|---|
| 2,982,868 | 5/1961 | Emile, Jr. | 307/253 |
| 3,113,219 | 12/1963 | Gilmore | 307/253 X |
| 3,191,066 | 6/1965 | Staudenmayer | 307/253 X |
| 3,243,607 | 3/1966 | Matsumoto et al. | 307/254 X |
| 3,280,368 | 10/1966 | Ahmed et al. | 307/254 X |
| 3,766,414 | 10/1973 | Blackburn et al. | 307/254 X |
| 4,063,116 | 12/1977 | Schmoock | 307/254 |

Primary Examiner—William M. Shoop
Attorney, Agent, or Firm—Nathan Edelberg; Robert P. Gibson; Fred M. Bush

[57] ABSTRACT

A multivibrator controlled, transistor switching circuit having a controllable pulse period and variable voltage output for providing low voltage switching of a high operating voltage, high power output circuit.

4 Claims, 1 Drawing Figure

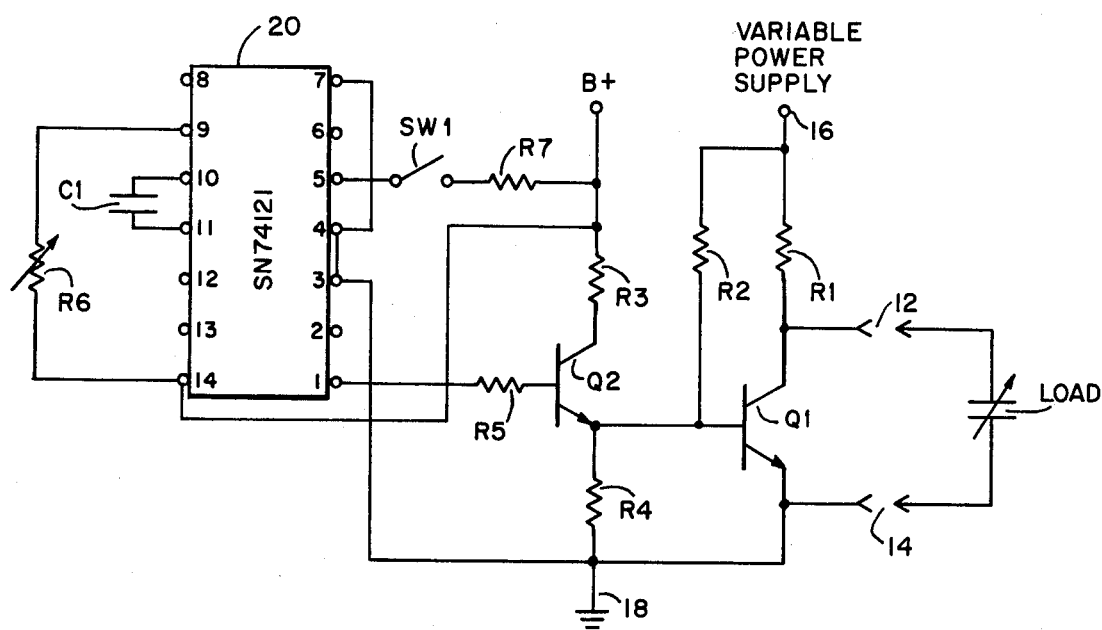

POWER TRANSITION CIRCUIT

DEDICATORY CLAUSE

The invention described herein may be manufactured, used, and licensed by or for the Government for governmental purposes without the payment to me of any royalities thereon.

SUMMARY OF THE INVENTION

A transistor switching circuit allows transition from low voltage switching and forming circuitry to a high operating voltage, high power output circuit. A timing circuit provides a variable pulse width or period for coupling a variable high voltage to a load circuit.

BRIEF DESCRIPTION OF THE DRAWING

The single FIGURE is a circuit diagram of a preferred embodiment of the power transition circuit.

DESCRIPTION OF THE PREFERRED EMBODIMENT

Referring now to the single FIGURE wherein a preferred embodiment is disclosed, an output transistor Q1 is adapted with output terminals 12 and 14 respectively connected to the collector and emitter thereof for applying electrical energy to a load therethrough. A variable power supply (not shown) is coupled to terminal 16 for supplying the energy for the load, being coupled to the collector and base of Q1 through resistors R1 and R2 respectively. The emitter of Q1 is coupled to a circuit ground or common 18. A transistor Q2 controls Q1 and is coupled through a resistor R3 to a low voltage source B+, which may be considerably less than the variable power supply input at 16. The emitter of Q2 is resistively coupled to circuit common 18 through resistor R4, and the base of Q2 is adapted for receiving a switching or controlling input. A timing circuit 20 has an output that provides the control pulse through a resistor R5 to the base of Q2. Timing circuit 20 provides a variable pulse width output to the base of Q2 for controllably varying the period that power is supplied through R1 to the load. Timing circuit 20 is standard transistor-transistor logic (TTL) as can be provided by a one shot multivibrator such as the Texas Instrument SN74121 circuit. For the SN74121 the output pulse comes from pin 1, the input supply voltage from B+ goes to pin 14 and through a variable resistor R6 to pin 9. R6 is adjustable to provide fine tuning of the output pulse width or period. In conjunction with R6, capacitor C1 is coupled across pins 10 and 11 to provide the circuit gross timing. Circuit common 18 is coupled to pins 3, 4, and 7. Pin 5 of SN74121 is adapted to receive a trigger input for switching the one shot. Typically, switch SW1 and resistor R7 are shown coupled from B+ to pin 5 to provide this input when SW1 is momentarily operated. Obviously this switching may be manually or automatically accomplished depending on the load circuit involved.

In operation, prior to pulsing, transistors Q1 and Q2 are in the ON condition. With Q2 in an ON state, R4 biases the base of Q1 ON. With Q1 in an ON state, resistor R1 limits the current drain of the variable power supply and output terminals 12 and 14 are effectively short-circuited through the transistor. The only limiting factor to the variable power supply output is Q1. Transistor Q1 is selected to have a collector-to-base open circuit voltge and an emitter-to-collector open circuit voltage greater than the maximum power supply voltage.

When a trigger pulse is supplied to pin 5 of timing circuit 20, a positive pulse is supplied from B+. The multivibrator output at pin 1 drops causing Q2 to turn OFF and the Q2 emitter voltage to drop to 0 volts. This drop in voltage at the base of Q1 causes Q1 to turn OFF, removing the short-circuit across terminals 12 and 14 and thereby allowing power to be coupled across the terminals. After a predetermined time the one shot multivibrator of timing circuit 20 resets, restoring transistor Q2 and Q1 to the ON state.

By having both the time and the supply voltage variable, energy supplied to the load circuit may be varied, a short pulse supplying little energy and a longer pulse supplying more energy. The power transition circuit allows interfacing of circuits having different supply voltages and provides a low voltage control for output circuits utilizing a variable supply voltage. The circuit is ready for subsequent pulses as soon as the transistor have reset to the steady state ON condition. A typical load circuit may be a capacitor being tested or observed for its voltage or current response, or a high power switching circuit.

While the invention has been described in connection with a certain specific embodiment thereof, it should be understood that further modifications will suggest themselves to persons skilled in the art and it is intended to cover such modifications as may fall within the scope of the claims appended hereto.

I claim:

1. A power transition circuit comprising: switching means for providing output pulses of electrical energy, driving means for gating said switching means on and off; and timing means for providing a controllable pulse width signal to said driving means for controlling the period of operation of said switching means, said timing means being adapted to receive input pulses of voltage for initiating said pulse width signal.

2. A power transition circuit as set forth in claim 1 wherein said switching means is a first transistor adapted for providing said output pulses across the collector and emitter thereof when said transistor is in an off state, and said driving means is a second transistor emitter coupled to the base of said first transistor and having the base thereof coupled to receive said timing circuit output and the collector coupled to receive operating voltage.

3. A power transition circuit as set forth in claim 2 wherein said second transistor is adapted for low voltage operation and said first transistor is adapted for coupling a high voltage through said transistor during an on state and to said load during an off state.

4. A power transition circuit as set forth in claim 3 wherein said timing circuit is a one shot multivibrator having an adjustable period of operation.

* * * * *